(12) United States Patent
Miki

(10) Patent No.: US 10,790,539 B2
(45) Date of Patent: *Sep. 29, 2020

(54) FLUORIDE ION BATTERY AND METHOD FOR PRODUCING FLUORIDE ION BATTERY

(71) Applicant: TOYOTA JIDOSHA KABUSHIKI KAISHA, Toyota-shi, Aichi-ken (JP)

(72) Inventor: Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,784

(22) Filed: Sep. 29, 2017

(65) Prior Publication Data

US 2018/0131039 A1    May 10, 2018

(30) Foreign Application Priority Data

Nov. 8, 2016   (JP) .................................. 2016-218172

(51) Int. Cl.
*H01M 10/0562* (2010.01)
*C01F 17/00* (2020.01)
(Continued)

(52) U.S. Cl.
CPC ..... *H01M 10/0562* (2013.01); *H01M 4/0445* (2013.01); *H01M 4/133* (2013.01);
(Continued)

(58) Field of Classification Search
CPC combination set(s) only.
See application file for complete search history.

(56) References Cited

U.S. PATENT DOCUMENTS

| 3,973,990 A | 8/1976 | Borger et al. |
| 4,948,680 A * | 8/1990 | Madou ............... B01J 23/002 252/62.2 |

(Continued)

FOREIGN PATENT DOCUMENTS

| CN | 101341614 A | 1/2009 |
| CN | 102754257 A | 10/2012 |

(Continued)

OTHER PUBLICATIONS

Reddy, M. Anji; Fichtner, M.; "Batteries based on fluoride shuttler", Jul. 25, 2011; RSC Publishing, Journal of Materials Chemistry, vol. 21, No. 43, pp. 17059-17062. (Year: 2011).*

(Continued)

*Primary Examiner* — Kaity V Chandler
(74) *Attorney, Agent, or Firm* — Oliff PLC

(57) ABSTRACT

An object of the present disclosure is to provide a fluoride ion battery of which power generating elements (a cathode active material layer, a solid electrolyte layer, and an anode active material layer) may be formed by two kinds of members: an electrode layer and a solid electrolyte layer. The present disclosure achieves the object by providing a fluoride ion battery comprising: an electrode layer that includes a first metal element or a carbon element and has capability of fluorination and defluorination; a solid electrolyte layer containing a solid electrolyte material, the solid electrolyte material including a second metal element with lower fluorination potential and defluorination potential than the potentials of the first metal element or the carbon element; and an anode current collector, in this order; and an anode active material layer being not present between the solid electrolyte layer and the anode current collector.

16 Claims, 2 Drawing Sheets

(51) Int. Cl.

| | | |
|---|---|---|
| *H01M 4/38* | (2006.01) | |
| *H01M 4/04* | (2006.01) | |
| *H01M 4/58* | (2010.01) | |
| *H01M 4/66* | (2006.01) | |
| *H01M 4/133* | (2010.01) | |
| *H01M 4/1395* | (2010.01) | |
| *H01M 4/136* | (2010.01) | |
| *H01M 4/134* | (2010.01) | |
| *H01M 4/583* | (2010.01) | |
| *H01M 4/1397* | (2010.01) | |
| *H01M 10/05* | (2010.01) | |
| *H01M 10/0585* | (2010.01) | |
| *H01M 4/02* | (2006.01) | |

(52) U.S. Cl.
CPC ......... *H01M 4/134* (2013.01); *H01M 4/136* (2013.01); *H01M 4/1395* (2013.01); *H01M 4/1397* (2013.01); *H01M 4/582* (2013.01); *H01M 4/5835* (2013.01); *H01M 10/05* (2013.01); *H01M 10/0585* (2013.01); *H01M 2004/027* (2013.01)

(56) References Cited

U.S. PATENT DOCUMENTS

| | | | |
|---|---|---|---|
| 6,379,841 B1 | 4/2002 | Potanin et al. | |
| 7,722,993 B2 | 5/2010 | Potanin | |
| 9,786,905 B2 | 10/2017 | Holme et al. | |
| 2002/0031706 A1 | 3/2002 | Dasgupta et al. | |
| 2008/0102373 A1* | 5/2008 | Potanin .............. | H01M 4/0492 429/309 |
| 2010/0035159 A1 | 2/2010 | Yoshino et al. | |
| 2010/0129713 A1 | 5/2010 | Yazami et al. | |
| 2011/0143219 A1 | 6/2011 | Weiss et al. | |
| 2012/0164541 A1 | 6/2012 | Darolles et al. | |
| 2013/0048924 A1 | 2/2013 | Amatucci et al. | |
| 2013/0162216 A1 | 6/2013 | Zhamu et al. | |
| 2014/0030559 A1 | 1/2014 | Yazami et al. | |
| 2014/0117291 A1 | 5/2014 | Amatucci et al. | |
| 2014/0170493 A1 | 6/2014 | Holme et al. | |
| 2014/0272564 A1* | 9/2014 | Holme .................. | H01M 4/364 429/211 |
| 2015/0118572 A1 | 4/2015 | Lund et al. | |
| 2015/0243992 A1 | 8/2015 | Maruyama et al. | |
| 2017/0365854 A1 | 12/2017 | Gopalakrishnannair et al. | |

FOREIGN PATENT DOCUMENTS

| | | |
|---|---|---|
| JP | 2012-089421 A | 5/2012 |
| JP | 2013-510409 A | 3/2013 |
| JP | 2013-145758 A | 7/2013 |
| JP | 2014-086226 A | 5/2014 |
| JP | 2015-181120 A | 10/2015 |
| JP | 2016-173915 A | 9/2016 |
| JP | 2017-084506 A | 5/2017 |
| JP | 2017-088427 A | 5/2017 |
| RU | 2295178 C2 | 3/2007 |
| WO | 2007/146453 A2 | 12/2007 |
| WO | 2011/057263 A1 | 5/2011 |

OTHER PUBLICATIONS

Potanin. "Solid-state chemical current source based on ionic conductor of Lanthanum trifluoride type." J. rus. Chem. Mendeleev D.I. Soc., vol. 45, No. 5-6, 2001.
Mar. 11, 2019 Corrected Notice of Allowability issued in U.S. Appl. No. 15/708,643.
F. Gschwind et al., "Fluoride ion batteries: Theoretical performance, safety, toxicity, and a combinatorial screening of new electrodes," Journal of Fluorine Chemistry 182 (2016), 76-90.
Jan. 3, 2019 Notice of Allowance issued in U.S. Appl. No. 15/708,643.
Sep. 4, 2019 Office Action issued in U.S. Appl. No. 15/708,643.
Jun. 3, 2019 Notice of Allowance issued in U.S. Appl. No. 15/708,643.
Jan. 17, 2020 Office Action issued in U.S. Appl. No. 15/708,643.
Apr. 24, 2020 Notice of Allowance issued in U.S. Appl. No. 15/708,641.

* cited by examiner

Charge →
← Discharge

Charge →
← Discharge

FLUORIDE ION BATTERY AND METHOD FOR PRODUCING FLUORIDE ION BATTERY

TECHNICAL FIELD

The present disclosure relates to a fluoride ion battery and a method for producing the fluoride ion battery.

BACKGROUND ART

As high-voltage and high-energy density batteries, for example, Li ion batteries are known. The Li ion battery is a cation-based battery utilizing Li ions as the carrier. Meanwhile, as anion-based batteries, fluoride ion batteries utilizing fluoride ions as the carrier are known. For example, Patent Literature 1 discloses an electrochemical cell (fluoride ion battery) provided with a cathode, an anode, and an electrolyte that can conduct an anion charge carrier ($F^-$).

CITATION LIST

Patent Literature

Patent Literature 1: Japanese Patent Application Laid-Open (JP-A) No. 2013-145758

SUMMARY OF DISCLOSURE

Technical Problem

In a general fluoride ion battery, 5 kinds of members: a cathode current collector, a cathode active material layer, an electrolyte layer, an anode active material layer, and an anode current collector, are used. On the other hand, in light of reducing cost of a battery, for example, a battery having a simple structure is preferable. The present disclosure has been made in view of the above circumstances, and a main object thereof is to provide a fluoride ion battery of which power generating elements (a cathode active material layer, a solid electrolyte layer, and an anode active material layer) may be formed by two kinds of members: an electrode layer and a solid electrolyte layer.

Solution to Problem

In order to achieve the object, the present disclosure provides a fluoride ion battery comprising: an electrode layer that includes a first metal element or a carbon element and has capability of fluorination and defluorination; a solid electrolyte layer containing a solid electrolyte material, the solid electrolyte material including a second metal element with lower fluorination potential and defluorination potential than the potentials of the first metal element or the carbon element; and an anode current collector, in this order; and an anode active material layer being not present between the solid electrolyte layer and the anode current collector.

According to the present disclosure, the specific two kinds of members, an electrode layer and a solid electrolyte layer, may form the power generating elements of a fluoride ion battery.

In the disclosure, the anode current collector may be directly disposed on a surface of the solid electrolyte layer.

Also, the present disclosure provides a fluoride ion battery comprising: an electrode layer that includes a first metal element or a carbon element and has capability of fluorination and defluorination; a solid electrolyte layer containing a solid electrolyte material, the solid electrolyte material including a second metal element with lower fluorination potential and defluorination potential than the potentials of the first metal element or the carbon element; and an anode current collector, in this order; and a fluoride layer containing a fluoride of the first metal element or the carbon element on a surface, that is the anode current collector side, of the electrode layer; and an anode active material layer containing a simple substance of the second metal element on a surface, that is the anode current collector side, of the solid electrolyte layer.

According to the present disclosure, the specific two kinds of members, an electrode layer and a solid electrolyte layer, may form the power generating elements of a fluoride ion battery.

In the disclosure, the anode current collector may be the same member as the electrode layer.

In the disclosure, the fluoride ion battery may further comprise a bipolar structure in which a plurality of the electrode layers and the solid electrolyte layers are alternately disposed.

In the disclosure, the first metal element may be at least one kind of Pb, Cu, Sn, In, Bi, Sb, Ni, Co, La, Ce, Mn, V, Fe, Cr, Nb, Ti, and Zn.

In the disclosure, the second metal element may be at least one kind of La, Ba, Pb, Sn, Ca, and Ce.

In the disclosure, the solid electrolyte material may be at least one kind of $La_{1-x}Ba_xF_{3-x}$ in which $0 \le x \le 2$, $Pb_{2-x}Sn_xF_4$ in which $0 \le x \le 2$, $Ca_{2-x}Ba_xF_4$ in which $0 \le x \le 2$, and $Ce_{1-x}Ba_xF_{3-x}$ in which $0 \le x \le 2$.

Also, the present disclosure provides a method for producing a fluoride ion battery, the method comprising: a laminated body forming step of forming a laminated body including: an electrode layer that includes a first metal element or a carbon element and has capability of fluorination and defluorination; a solid electrolyte layer containing a solid electrolyte material, the solid electrolyte material including a second metal element with lower fluorination potential and defluorination potential than the potentials of the first metal element or the carbon element; and an anode current collector, in this order; and an anode active material layer being not present between the solid electrolyte layer and the anode current collector.

According to the present disclosure, a fluoride ion battery, of which power generating elements may be formed by the combination of the specific electrode layer and solid electrolyte layer, may be obtained.

In the disclosure, the method may further comprise a charging step of charging the laminated body, forming a fluoride layer containing a fluoride of the first metal element or the carbon element on a surface, that is the anode current collector side, of the electrode layer, and forming an anode active material layer containing a simple substance of the second metal element on a surface, that is the anode current collector side, of the solid electrolyte layer.

Advantageous Effects of Disclosure

The present disclosure exhibits effects such as a fluoride ion battery of which power generating elements may be formed from two kinds of members: an electrode layer and a solid electrolyte layer.

DESCRIPTION OF EMBODIMENTS

The fluoride ion battery and the method for producing the fluoride ion battery of the present disclosure will be hereinafter described in detail.

A. Fluoride Ion Battery

Figure 1A:
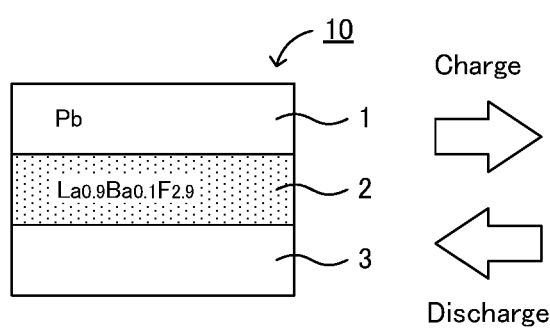
FIGS. 1A and 1B are schematic cross-sectional views exemplifying the fluoride ion battery of the present disclosure.
Figure 1B:
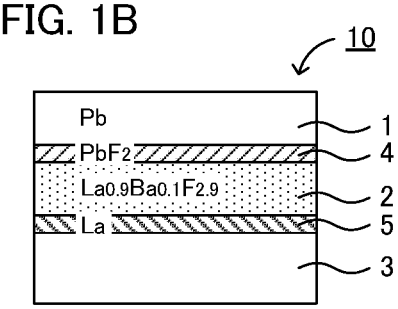

FIGS. 1A and 1B are schematic cross-sectional views exemplifying the fluoride ion battery of the present disclosure. FIG. 1A shows the state before charge, and FIG. 1B shows the state after charge. Fluoride ion battery 10 shown in FIGS. 1A and 1B each comprises electrode layer 1 that includes a first metal element or a carbon element and has capability of fluorination and defluorination; solid electrolyte layer 2 containing a solid electrolyte material, the solid electrolyte material including a second metal element with lower fluorination potential and defluorination potential than the potentials of the first metal element or the carbon element; and anode current collector 3, in this order in the thickness direction.

In fluoride ion battery 10 shown in FIG. 1A, an anode active material layer is not present between solid electrolyte layer 2 and anode current collector 3. In FIG. 1A, electrode layer 1 is directly disposed on one surface of solid electrolyte layer 2, and anode current collector 3 is directly disposed on the other surface of solid electrolyte layer 2. Here, when electrode layer 1 is a Pb foil, and solid electrolyte layer 2 is $La_{0.9}Ba_{0.1}F_{2.9}$ (solid electrolyte material), and if the fluoride ion battery 10 shown in FIG. 1A were charged, the fluorination reaction of electrode layer 1 (Pb foil) would occur in the interface between electrode layer 1 and solid electrolyte layer 2, and thereby $PbF_2$ would be obtained. The $PbF_2$ corresponds to a charged cathode active material layer (fluoride layer 4). Incidentally, electrode layer 1 (Pb foil) not in the reaction with fluoride ions may function as a cathode current collector.

Meanwhile, in the interface between solid electrolyte layer 2 and anode current collector 3, the defluorination reaction of solid electrolyte layer 2 ($La_{0.9}Ba_{0.1}F_{2.9}$) would occur, and thereby a simple substance of La would be generated $(La_{0.9}Ba_{0.1}F_{2.9}+2.7e^- \rightarrow 0.9La+0.1BaF_2+2.7F^-)$. A simple substance of La corresponds to a simple substance of the second metal element, and the layer containing a simple substance of La corresponds to anode active material layer 5. It means that anode active material layer 5 would be generated from solid electrolyte layer 2 in a self-forming manner. In this manner, for example, power generating elements of a battery (a cathode active material layer, a solid electrolyte layer, and an anode active material layer) may be formed from the two kinds of members: a Pb foil and $La_{0.9}Ba_{0.1}F_{2.9}$.

Accordingly, obtained by charging fluoride ion battery 10 shown in FIG. 1A is fluoride ion battery 10 comprising: fluoride layer 4 containing a fluoride of the first metal element or the carbon element on a surface, that is anode current collector 3 side, of electrode layer 1; and anode active material layer 5 containing a simple substance of the second metal element on a surface, that is anode current collector 3 side, of solid electrolyte layer 2, as shown in FIG. 1B.

According to the present disclosure, the specific two kinds of members, an electrode layer and a solid electrolyte layer, may form the power generating elements of a fluoride ion battery. Reduction in the number of the members used allows reduction in the cost of a battery. Also, the electrode layer provides functions as both a current collector and a cathode active material layer. Accordingly, it is unnecessary to use additional member as a cathode current collector, and thus increasing energy density of the battery is more achievable.

In particular, in the present disclosure, it has been found out that power generating elements of a battery (a cathode active material layer, a solid electrolyte layer, and an anode active material layer) may be formed by just the combination of an electrode layer with the solid electrolyte layer which may be an anode active material layer by the self-forming reaction. Such a reaction mechanism is peculiar to a fluoride ion all solid battery (a fluoride ion battery comprising a solid electrolyte layer), and is a reaction mechanism not conventionally known.

The fluoride ion battery of the present disclosure will be hereinafter described in each constitution.

1. Electrode Layer

The electrode layer in the present disclosure is a layer that includes a first metal element or a carbon element and has capability of fluorination and defluorination. The first metal element or the carbon element is usually fluorinated upon charge, and defluorinated upon discharge. A fluoride ion reacts with a lot of elements due to its extremely high nucleophilicity, so that a fluoride is formed. Meanwhile, defluorination reaction is required to occur upon discharge in the electrode layer. It means that the electrode layer is required to be a layer in which not only fluorination reaction but also defluorination reaction may occur. Also, the electrode layer provides functions as both a current collector (or an intermediate current collector) and a cathode active material layer.

Examples of the electrode layer may include a metal electrode layer including the first metal element, and a carbon electrode layer including the carbon element. Examples of the metal electrode layer may include a simple substance and an alloy, including the first metal element. Examples of the first metal element may include at least one kind of Pb, Cu, Sn, In, Bi, Sb, Ni, Co, La, Ce, Mn, V, Fe, Cr, Nb, Ti and Zn. If the metal electrode layer is an alloy, the alloy may include only one kind of the first metal element, and may include two kinds or more of the first metal elements. In the latter case, among a plurality of the first metal elements, a metal element with the highest fluorination potential and defluorination potential (hereinafter referred to as metal element A) is preferably the main component of the alloy. The proportion of the metal element A in the alloy may be 50 mol % or more, may be 70 mol % or more, and may be 90 mol % or more. Also, examples of the carbon electrode layer may include graphite and graphene.

The thickness of the electrode layer before charge is, for example, 5 μm or more, and preferably 50 μm or more. If the thickness of the electrode layer before charge is too small, the thickness of the portion that functions as a current collector upon charge (the portion not in the reaction with fluoride ions) becomes small, and the sufficient current collecting function may not be possibly obtained. Incidentally the electrode layer before charge refers to an electrode layer in which the fluoride layer containing a fluoride of the first metal element or the carbon element is not present. Also, although the electrode layer functions as a cathode current collector, considering the corrosion due to fluorination, an auxiliary current collector with high chemical stability may be additionally arranged. Examples of the auxiliary current collector may include a current collector including a noble metal such as Au and Pt.

2. Solid Electrolyte Layer

The solid electrolyte layer in the present disclosure is a layer containing a solid electrolyte material, the solid electrolyte material including a second metal element with lower fluorination potential and defluorination potential than the potentials of the first metal element or the carbon element. The second metal element is usually deposited as a simple substance of metal upon charge, and fluorinated upon discharge. Also, a part of the solid electrolyte layer may become an anode active material layer by a self-forming reaction upon charge.

The solid electrolyte material is usually a material that has fluoride ion conductivity and includes a second metal element and an F element. The second metal element has lower fluorination potential and defluorination potential than those of the first metal element or the carbon element. In other words, when the electrode layer includes a first metal element, the second metal element has lower fluorination potential and defluorination potential than those of the first metal element. Similarly, when the electrode layer includes a carbon element, the second metal element has lower fluorination potential and defluorination potential than those of the carbon element. The fluorination potential and the defluorination potential may be measured by, for example, cyclic voltammetry (CV). The difference of the fluorination potential of the first metal element or the carbon element from that of the second metal element is, for example, 0.05 V or more, and preferably 0.1 V or more. Also, the difference of the defluorination potential of the first metal element or the carbon element from that of the second metal element is, for example, 0.05 V or more, and preferably 0.1 V or more.

Examples of the second metal element may include at least one kind of La, Ba, Pb, Sn, Ca, and Ce. The solid electrolyte material may include just one kind of the second metal element, and may include two or more kinds thereof. In the latter case, among a plurality of the second metal elements, a metal element with the highest fluorination potential and defluorination potential (hereinafter referred to as metal element B) is preferably the main component among all the metal elements included in the solid electrolyte material. The proportion of the metal element B among all the metal elements included in the solid electrolyte material may be 50 mol % or more, may be 70 mol % or more, and may be 90 mol % or more.

Examples of the solid electrolyte material may include at least one kind of $La_{1-x}Ba_xF_{3-x}$ in which $0 \leq x \leq 2$, $Pb_{2-x}Sn_xF_4$ in which $0 \leq x \leq 2$, $Ca_{2-x}Ba_xF_4$ in which $0 \leq x \leq 2$, and $Ce_{1-x}Ba_xF_{3-x}$ in which $0 \leq x \leq 2$. The x may be, respectively, larger than 0, may be 0.3 or more, may be 0.5 or more, and may be 0.9 or more. Also, the x may be, respectively, smaller than 1, may be 0.9 or less, may be 0.5 or less, and may be 0.3 or less. The shape of the solid electrolyte material is not limited, and examples thereof may include a granular shape.

The thickness of the solid electrolyte layer before charge is, for example, 10 μm or more, and preferably 50 μm or more. Meanwhile, the thickness of the solid electrolyte layer before charge is, for example, 300 μm or less. If the thickness of the solid electrolyte layer before charge is too small, short circuit may possibly easily occur, and if the thickness of the solid electrolyte layer before charge is too large, increasing the energy density of the battery may not possibly be easily achieved. Incidentally, the solid electrolyte layer before charge refers to a solid electrolyte layer in which the anode active material layer containing a simple substance of the second metal element is not present.

For example, as shown in FIG. 1A, fluoride ion battery 10 may not include an anode active material layer between solid electrolyte layer 2 and anode current collector 3. Also, anode current collector 3 may be directly disposed on the surface of solid electrolyte layer 2. Similarly, electrode layer 1 may be directly disposed on the surface of solid electrolyte layer 2. Also, for example, as shown in FIG. 1B, fluoride ion battery 10 may comprise fluoride layer 4 containing a fluoride of the first metal element or the carbon element on the surface, that is anode current collector 3 side, of electrode layer 1. Similarly, fluoride ion battery 10 may comprise anode active material layer 5 containing a simple substance of the second metal element on a surface, that is anode current collector 3 side, of solid electrolyte layer 2. Also, by charging fluoride ion battery 10 shown in FIG. 1A, fluoride ion battery 10 shown in FIG. 1B may be obtained. Meanwhile, by discharging fluoride ion battery 10 shown in FIG. 1B, fluoride ion battery 10 shown in FIG. 1A may presumably be obtained.

The fluoride layer is a layer that contains a fluoride of the first metal element or the carbon element included in the electrode layer, and corresponds to a charged cathode active material layer. The thickness of the fluoride layer varies with the state of charge, and thus not limited. Also, the completely discharged electrode layer (such as electrode layer 1 in FIG. 1A) preferably has a uniform composition. In particular, a current collector portion in which fluorination reaction does not occur and an active material portion in which fluorination reaction and defluorination reaction have occurred preferably have atomic continuity. Whether the atomic continuity is present or not may be, for example, confirmed by observing the interface by a transmission electron microscope.

The anode active material layer is a layer containing a simple substance of the second metal element, and usually generated from the solid electrolyte layer in a self-forming manner. The thickness of the anode active material layer varies with the state of charge, and thus not limited. Also, the anode active material layer (such as anode active material layer 5 in FIG. 1B) preferably contains a residual component of the solid electrolyte material in addition to a simple substance of the second metal element. The residual component refers to, among the elements included in the solid electrolyte material, a component including an element other than the second metal element deposited as a simple substance of metal. For example, in the later described Examples, at the time of charge, a reaction of $La_{0.9}Ba_{0.1}F_{2.9}+2.7e^- \rightarrow 0.9La+0.1BaF_2+2.7F^-$ occurred. In this case, the La corresponds to a simple substance of the second metal element, and $BaF_2$ corresponds to the residual component. The residual component is preferably a metal fluoride.

3. Anode Current Collector

The anode current collector in the present disclosure collects currents of the anode active material. Examples of the anode current collector may include metal current collectors including metal elements, and carbon current collectors including carbon elements. Examples of the metal current collector may include a simple substance and an alloy. Examples of the metal element to be used in the metal current collector may include Au, Ag, Pt, Pd, Ph, Ir, Ru, and Os. Also, the metal element to be used in the metal current collector may be the above described first metal element. Meanwhile, examples of the carbon current collector may include graphite and graphene.

Also, the anode current collector may be the same member as the electrode layer. In this case, just two members: the electrode layer (anode current collector) and the solid electrolyte layer, may function as 5 members: a cathode current collector, a cathode active material layer, an electrolyte layer, an anode active material layer, and an anode current collector. As the result, reduction in the cost of a battery may be achieved.

Examples of the shape of the anode current collector may include a foil shape. The thickness of the anode current collector is, for example, 5 μm or more, and may be 10 μm or more. Meanwhile, the thickness of the anode current collector is, for example, 100 μm or less, and may be 50 μm or less. Also, considering the corrosion due to fluorination, an auxiliary current collector with high chemical stability may be arranged in addition to the anode current collector. Examples of the auxiliary current collector may include current collectors including noble metals such as Au and Pt.

4. Fluoride Ion Battery

The fluoride ion battery of the present disclosure is provided with the above described electrode layer, solid electrolyte layer, and anode current collector. The fluoride ion battery may further comprise a monopolar structure including a single electrode layer and solid electrolyte layer, or may further comprise a bipolar structure in which a plurality of the electrode layers and the solid electrolyte layers are alternately disposed. In the latter case, increase in the voltage of a battery may be achieved.

Figure 2A:
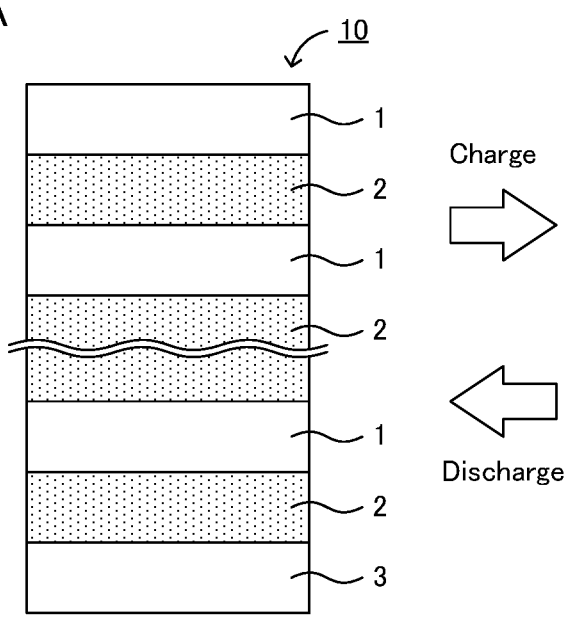
FIGS. 2A and 2B are schematic cross-sectional views exemplifying the fluoride ion battery of the present disclosure.
Figure 2B:
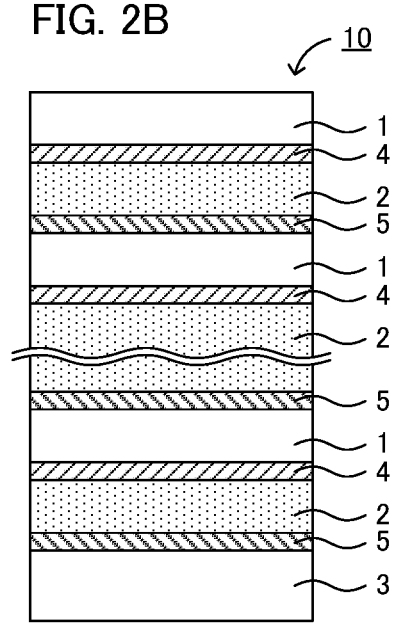

FIGS. 2A and 2B are schematic cross-sectional views exemplifying the fluoride ion battery of the present disclosure; FIG. 2A shows the state before charge, and FIG. 2B shows the state after charge. Fluoride ion battery 10 shown in each FIGS. 2A and 2B comprises: electrode layer 1 that includes a first metal element of a carbon element and has capability of fluorination and defluorination; solid electrolyte layer 2 containing a solid electrolyte material, the solid electrolyte material including a second metal element with lower fluorination potential and defluorination potential than the potentials of the first metal element or the carbon element; and anode current collector 3, in this order in the thickness direction; and further comprises a bipolar structure in which a plurality of electrode layers 1 and solid electrolyte layers 2 are alternately disposed.

Also, for example, as shown in FIG. 2A, electrode layers 1 may be directly disposed on the both surfaces of solid electrolyte layers 2 in the bipolar structure. Also, for example, as shown in FIG. 2B, fluoride ion battery 10 may comprise fluoride layers 4 containing fluorides of the first metal element or the carbon element on surfaces, that are anode current collectors 3 side, of electrode layers 1, in the bipolar structure, and may comprise anode active material layers 5 containing a simple substance of the second metal element on surfaces, that are anode current collectors 3 side, of solid electrolyte layers 2, in the bipolar structure.

In the bipolar structure, the electrode layer at the end (such as electrode layer 1 positioned at the top in FIGS. 2A and 2B) functions as a cathode current collector and a cathode active material layer. Meanwhile, the electrode layer sandwiched by solid electrolyte layers (such as electrode layer 1 positioned in the second from the top in FIGS. 2A and 2B) functions as an intermediate current collector and a cathode active material layer. When an electrode layer and a solid electrolyte layer is counted as a structural unit, the number of the structural unit in the bipolar structure is, for example, 2 or more, and may be 10 or more. Meanwhile, the number of the structural unit in the bipolar structure is, for example, 100 or less.

Here, among fluoride ion all solid batteries using metal active materials, it is considered that the battery using Cu in the cathode active material layer and using La or Ce in the anode active material layer may function at the highest potential; however, the battery voltage is approximately 3 V, which is lower than that of the conventional lithium ion all solid batteries. Accordingly, when increase in a battery voltage is intended, it is necessary to increase the number of cells to be connected in series. Meanwhile, considering the corrosion due to fluorination, it is highly necessary to use a noble metal such as Au and Pt as a cathode current collector. From these points, when increase in a battery voltage is intended, the use of noble metals is presumably increased as well.

In contrast, when the bipolar structure is applied for a battery, the use of noble metals may be reduced while intending to increase the battery voltage. As shown in the above described FIG. 2B, the electrode layer sandwiched by solid electrolyte layers functions as an intermediate current collector so that the usage of noble metals is not mandatory; thus, the use of noble metals may be reduced. As the result, reduction in the cost of a battery may be achieved. Also, since noble metals are relatively heavier than the other elements, the energy density per battery weight may be increased by reducing the use of noble metals.

The fluoride ion battery of the present disclosure is usually a secondary battery, so as to be repeatedly charged and discharged, and be useful as a car-mounted battery for example. Incidentally, the secondary battery includes a usage of a secondary batter as a primary battery (the use for the purpose of just one time discharge after charge). Also, examples of the shape of the fluoride ion battery may include a coin shape, a laminate shape, a cylindrical shape, and a square shape. Also, the battery case to be used for the fluoride ion battery is not limited.

B. Method for Producing Fluoride Ion Battery

Figure 3A:
FIGS. 3A to 3D are schematic cross-sectional views exemplifying the method for producing the fluoride ion battery of the present disclosure.
Figure 3B:
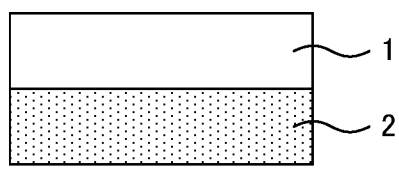
Figure 3C:
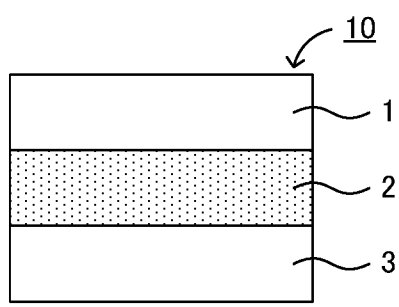
Figure 3D:
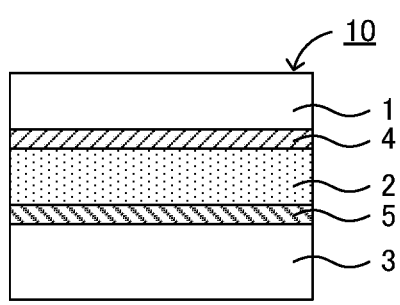

FIGS. 3A to 3D are the schematic cross-sectional views illustrating the method for producing the fluoride ion battery of the present disclosure. In FIGS. 3A to 3D, firstly prepared is electrode layer 1 that includes a first metal element or a carbon element and has capability of fluorination and defluorination (FIG. 3A). Next, a solid electrolyte material including a second metal element with lower fluorination potential and defluorination potential than the potentials of the first metal element or the carbon element, is directly disposed on one surface of electrode layer 1 and pressed so as to form solid electrolyte layer 2 (FIG. 3B). Next, anode current collector 3 is directly disposed on the surface, that is opposite to electrode layer 1, of solid electrolyte layer 2, and pressed (FIG. 3C). In this manner, a laminated body including electrode layer 1, solid electrolyte layer 2, and anode current collector 3 in this order is formed; thereby, fluoride ion battery 10 before charge may be obtained. Further, optionally, the obtained laminated body (fluoride ion battery 10 before charge) is charged, fluoride layer 4 containing a fluoride of the first metal element or the carbon element is formed on a surface, that is anode current collector 3 side, of electrode layer 1, and anode active material layer 5 containing a simple substance of the second metal element is formed on a surface, that is anode current collector 3 side, of solid electrolyte layer 2. Thereby, fluoride ion battery 10 after charge may be obtained.

According to the present disclosure, a fluoride ion battery, of which power generating elements may be formed by the combination of the specific electrode layer and solid electrolyte layer, may be obtained.

The method for producing the fluoride ion battery of the present disclosure will be described by each step.

1. Laminated Body Forming Step

The laminated body forming step in the present disclosure is a step of forming a laminated body including: an electrode layer that includes a first metal element or a carbon element and has capability of fluorination and defluorination; a solid electrolyte layer containing a solid electrolyte material, the solid electrolyte material including a second metal element with lower fluorination potential and defluorination potential than the potentials of the first metal element or the carbon element; and an anode current collector, in this order; and an anode active material layer being not present between the solid electrolyte layer and the anode current collector. The electrode layer, the solid electrolyte layer, the anode current collector and the other members are respectively in the same contents as those described in "A. Fluoride ion battery" above; thus, the descriptions herein are omitted.

The method for producing the laminated body is not limited, and an arbitrary method may be applied. For example, the solid electrolyte layer may be stacked on the electrode layer, and the anode current collector may be stacked thereafter; and the solid electrolyte layer may be stacked on the anode current collector, and then the electrode layer may be stacked thereafter. Also, the solid electrolyte layer may be produced and thereafter one of the electrode layer and the anode current collector may be stacked followed by stacking the other; and the solid electrolyte layer may be produced and thereafter the electrode layer and the anode current collector may be stacked at the same time. Also, when the fluoride ion battery has the bipolar structure, for example, the bipolar structure may be formed by producing a member in which the solid electrolyte layer is stacked on the electrode layer, and stacking the member plurality of times. Incidentally, it is preferable to press upon stacking each member and producing the solid electrolyte layer as required.

2. Charging Step

In the present disclosure, the method may further comprise a charging step of charging the laminated body, forming a fluoride layer containing a fluoride of the first metal element or the carbon element on a surface, that is the anode current collector side, of the electrode layer, and forming an anode active material layer containing a simple substance of the second metal element on a surface, that is the anode current collector side, of the solid electrolyte layer. The conditions for charging may be appropriately selected depending on factors such as the members included in the fluoride ion battery.

3. Fluoride Ion Battery

The fluoride ion battery to be obtained by the method above is in the same contents as those described in "A. Fluoride ion battery" above; thus, the description herein is omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be described in more details with reference to Examples.

Example 1

Production of Solid Electrolyte Material $LaF_3$ and $BaF_2$ were weighed so as to be $LaF_3:BaF_2=9:1$ in the molar ratio, and crushed and mixed by ball milling at 600 rpm for 12 hours. After that, the obtained mixture was heat treated at 600° C. for 10 hours in an Ar atmosphere to obtain $La_{0.9}Ba_{0.1}F_{2.9}$.

Production of Evaluation Cell

Powder $La_{0.9}Ba_{0.1}F_{2.9}$ of 200 mg was placed on a Pb foil (electrode layer) and subjected to pressure powder molding so as to obtain a pellet. Three of the obtained pellets were stacked, a Pt foil (anode current collector) was arranged, and the product was subjected to pressure powder molding. A Pt foil (an auxiliary current collector) was placed on the surface, that is the cathode side, of the obtained laminated body, and thereby an evaluation cell was obtained.

[Evaluation]

Figure 4:
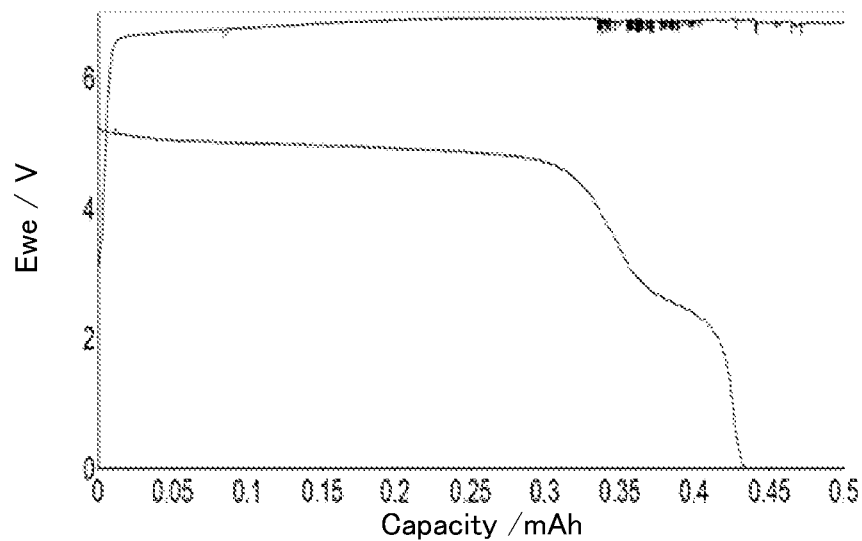
FIG. 4 is the result of a charge and discharge test for the evaluation cell obtained in Example 1.

A charge and discharge test was conducted for the evaluation cell obtained in Example 1. The conditions for the charge and discharge test were: under the environment at 140° C., currency of 50 μA/cm², and voltage of 0 V to 7 V. As shown in FIG. 4, by charging and discharging three cells stacked in series, a charge plateau was confirmed in the vicinity of 6.8 V, and a discharge plateau was confirmed in the vicinity of 5 V. The constitution of this evaluation cell is shown as follows:

Pt foil: auxiliary current collector;

Pb foil (the portion not in reaction with $F^-$): cathode current collector or intermediate current collector;

Pb foil (the portion in reaction with $F^-$): cathode active material layer

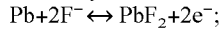
$Pb + 2F^- \leftrightarrow PbF_2 + 2e^-$;

$La_{0.9}Ba_{0.1}F_{2.9}$ (cathode current collector side): solid electrolyte layer;

$La_{0.9}Ba_{0.1}F_{2.9}$ (anode current collector side): anode active material layer

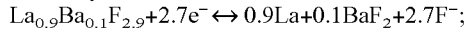
$La_{0.9}Ba_{0.1}F_{2.9} + 2.7e^- \leftrightarrow 0.9La + 0.1BaF_2 + 2.7F^-$;

Pt foil: anode current collector.

In this manner, two kinds of members: the electrode layer and the solid electrolyte layer, formed the power generating elements (the cathode active material layer, the solid electrolyte layer, and the anode active material layer) of the battery, and a fluoride ion battery that actually operated was obtained.

REFERENCE SIGNS LIST 1 electrode layer
2 solid electrolyte layer
3 anode current collector
4 fluoride layer
5 anode active material layer
10 fluoride ion battery

What is claimed is:

1. A fluoride ion battery utilizing only fluoride ions as carrier and comprising:
an electrode layer that includes a first metal element or a carbon element and has capability of fluorination and defluorination;
a solid electrolyte layer containing a solid electrolyte material, the solid electrolyte material including a second metal element with lower fluorination potential and defluorination potential than the potentials of the first metal element or the carbon element; and an anode current collector, in this order; and an anode active material layer being not present between the solid electrolyte layer and the anode current collector; and the fluoride battery further comprising a bipolar structure in which a plurality of the electrode layers and the solid electrolyte layers are alternately and directly disposed.

2. The fluoride ion battery according to claim 1, wherein the anode current collector is directly disposed on a surface of the solid electrolyte layer.

3. The fluoride ion battery according to claim 1, wherein the anode current collector is made of the same material as the electrode layer.

4. The fluoride ion battery according to claim 1, wherein the first metal element is at least one of Pb, Cu, Sn, In, Bi, Sb, Ni, Co, La, Ce, Mn, V, Fe, Cr, Nb, Ti, and Zn.

5. The fluoride ion battery according to claim 1, wherein the second metal element is at least one of La, Ba, Pb, Sn, Ca, and Ce.

6. The fluoride ion battery according to claim 1, wherein the solid electrolyte material is at least one of $La_{1-x}Ba_xF_{3-x}$ in which $0 \leq x \leq 2$, $Pb_{2-x}Sn_xF_4$ in which $0 \leq x \leq 2$, $Ca_{2-x}Ba_xF_4$ in which $0 \leq x \leq 2$, and $Ce_{1-x}Ba_xF_{3-x}$ in which $0 \leq x \leq 2$.

7. The fluoride ion battery according to claim 1, wherein the anode current collector is a metal current collector or a carbon current collector.

8. A fluoride ion battery utilizing only fluoride ions as carrier and comprising:

an electrode layer that includes a first metal element or a carbon element and has capability of fluorination and defluorination;

a solid electrolyte layer containing a solid electrolyte material, the solid electrolyte material including a second metal element with lower fluorination potential and defluorination potential than the potentials of the first metal element or the carbon element; and an anode current collector, in this order; and a fluoride layer containing a fluoride of the first metal element or the carbon element on a surface, that is the anode current collector side, of the electrode layer; and an anode active material layer containing a simple substance of the second metal element on a surface, that is the anode current collector side, of the solid electrolyte layer; and the fluoride battery further comprising a bipolar structure in which a plurality of the electrode layers and the solid electrolyte layers are alternately disposed interposing the fluoride layer.

9. The fluoride ion battery according to claim 8, wherein the anode current collector is made of the same material as the electrode layer.

10. The fluoride ion battery according to claim 8, wherein the first metal element is at least one of Pb, Cu, Sn, In, Bi, Sb, Ni, Co, La, Ce, Mn, V, Fe, Cr, Nb, Ti, and Zn.

11. The fluoride ion battery according to claim 8, wherein the second metal element is at least one of La, Ba, Pb, Sn, Ca, and Ce.

12. The fluoride ion battery according to claim 8, wherein the solid electrolyte material is at least one of $La_{1-x}Ba_xF_{3-x}$ in which $0 \leq x \leq 2$, $Pb_{2-x}Sn_xF_4$ in which $0 \leq x \leq 2$, $Ca_{2-x}Ba_xF_4$ in which $0 \leq x \leq 2$, and $Ce_{1-x}Ba_xF_{3-x}$ in which $0 \leq x \leq 2$.

13. The fluoride ion battery according to claim 8, wherein the anode current collector is a metal current collector or a carbon current collector.

14. A method for producing a fluoride ion battery utilizing only fluoride ions as carrier and, the method comprising:

a laminated body forming step of forming a laminated body including: an electrode layer that includes a first metal element or a carbon element and has capability of fluorination and defluorination; a solid electrolyte layer containing a solid electrolyte material, the solid electrolyte material including a second metal element with lower fluorination potential and defluorination potential than the potentials of the first metal element or the carbon element; and an anode current collector, in this order; and an anode active material layer being not present between the solid electrolyte layer and the anode current collector; and further forming a bipolar structure in which a plurality of the electrode layers and the solid electrolyte layers are alternately and directly disposed.

15. The method according to claim 14, further comprising a charging step of charging the laminated body, forming a fluoride layer containing a fluoride of the first metal element or the carbon element on a surface, that is the anode current collector side, of the electrode layer, and forming an anode active material layer containing a simple substance of the second metal element on a surface, that is the anode current collector side, of the solid electrolyte layer.

16. The method according to claim 14, wherein the anode current collector is a metal current collector or a carbon current collector.

* * * * *